(12) United States Patent
Hsu (10) Patent No.: US 10,932,608 B2
(45) Date of Patent: Mar. 2, 2021

(54) AIR COMPRESSED COFFEE OR TEA MAKING MACHINE

(71) Applicant: Wen Pin Hsu, Taipei (TW)

(72) Inventor: Wen Pin Hsu, Taipei (TW)

(*) Notice: Subject to any disclaimer, the term of this patent is extended or adjusted under 35 U.S.C. 154(b) by 258 days.

(21) Appl. No.: 16/255,835

(22) Filed: Jan. 24, 2019

(65) Prior Publication Data

US 2020/0237134 A1    Jul. 30, 2020

(51) Int. Cl.

| | |
|---|---|
| *A47J 31/32* | (2006.01) |
| *A47J 31/56* | (2006.01) |
| *B01D 29/05* | (2006.01) |
| *A23F 3/18* | (2006.01) |
| *A23F 5/26* | (2006.01) |
| *A47J 31/52* | (2006.01) |
| *A47J 31/24* | (2006.01) |

(52) U.S. Cl.
CPC ............. *A47J 31/32* (2013.01); *A23F 3/18* (2013.01); *A23F 5/262* (2013.01); *A47J 31/52* (2013.01); *A47J 31/56* (2013.01); *B01D 29/05* (2013.01); *A47J 31/24* (2013.01)

(58) Field of Classification Search
CPC .. A47J 31/32; A47J 31/24; A47J 31/36; A47J 31/3614
USPC ........... 99/302 R, 289 R, 286, 307, 317, 315
See application file for complete search history.

(56) References Cited

U.S. PATENT DOCUMENTS

| | | | | |
|---|---|---|---|---|
| 2,205,290 | A * | 6/1940 | Herrera | A47J 31/32 99/302 R |
| 2006/0230946 | A1* | 10/2006 | Cheng | A47J 31/32 99/300 |
| 2012/0100275 | A1* | 4/2012 | Bishop | A47J 31/32 426/474 |
| 2013/0133524 | A1* | 5/2013 | Vastardis | A47J 31/4403 99/300 |
| 2019/0045967 | A1* | 2/2019 | Briere | A47J 31/405 |
| 2020/0060463 | A1* | 2/2020 | Gardiner | A47J 31/38 |

* cited by examiner

*Primary Examiner* — Reginald Alexander (57) ABSTRACT

An air compressed coffee or tea making machine includes an air tank storing high pressure air; the air tank being connected to an air compressor for compressing external air so as to drive the high pressure air within the air tank; at least one liquid storage tank for storing liquid therein; a filtering tank installed below the air tank and connected to the liquid storage tank; a receiving tank installed below the filtering tank; the receiving tank serving for receiving coffee powders or tea powders therein. The liquid of the liquid storage tank is filled into the filtering tank; by the high pressure air from the air tank, liquid within the filtering tank suffers from a uniform air pressure and then flows to the receiving tank; as a result, the liquid is uniformly mixed with the coffee or tea powders within the receiving tank.

15 Claims, 7 Drawing Sheets

AIR COMPRESSED COFFEE OR TEA MAKING MACHINE

FIELD OF THE INVENTION

The field of the present invention is related to machine for making coffee or tea, and in particular to an air compressed coffee or tea making machine.

BACKGROUND OF THE INVENTION

The prior art coffee or tea making machine includes a liquid storage tank which has an output end for outputting liquid (water) therein. Air pressure is applied to the output liquid. A control unit is connected to the liquid storage tank for controlling the flow rate of the liquid. A filtering tank is positioned below an air tank. A bottom of the filtering tank has an opening which is connected to a first filtering net. The first filtering net is detachably connected to an opening of the filtering tank. A receiving tank is detachably installed to a lower opening of the filtering tank. A bottom of the receiving tank has an opening. A high pressure water is filled to the filtering tank from the liquid storage tank so that water flows through the receiving tank and then flows out of a lower opening of the receiving tank to mix coffee and tea.

In this prior art, the liquid directly flows from the liquid storage tank to the filtering tank to mix with coffee powders and tea powders, however, the liquid applied to the powders are not uniform. Therefore the coffee and tea liquids are not uniform, as a result coffees (or tea) in different cups have different odors.

SUMMARY OF THE INVENTION

Accordingly, for improving above mentioned defects, the present invention provides an air compressed coffee or tea making machine, wherein high pressure air is inputted into the filtering tank by using the air tank so that the surface of the filtering tank is suffered from a uniform pressure. When the liquid inputted to the disk, the coffee powders or tea powders on the disk are uniformly mixed with the liquid (water). By the way of the present invention, the coffee or tea liquid has uniform quality and thus the coffees or teas of different cups have the same odors. The control unit serves to control the liquid amount and temperature from the liquid storage tank to the filtering tank. The control unit could control the movement of the receiving tank to different positions for pouring, cleaning and filling.

To achieve above object, the present invention provides an air compressed coffee or tea making machine, comprising: an air tank storing high pressure air therein; a top of the air tank being connected to an output end of an air compressor; a bottom of the air tank being connected with a gas tube; the air compressor serving to compress external air and then transfers the compressed air into the air tank for driving the high pressure air within the air tank and then the air being transferred out through the gas tube, air pressure within the air tank being controllable; at least one liquid storage tank for storing liquid therein; the liquid storage tank having an output end for controlling flow rate of the liquid storage tank; a control unit connected to the liquid storage tank for controlling liquid flowing from the at least one liquid storage tank; a filtering tank installed below the air tank and connected the output end of the at least one liquid storage tank; a bottom of the filtering tank having an opening; a first filtering net being detachably installed in the opening of the filtering tank; a receiving tank installed below the opening of the filtering tank; a bottom of the receiving tank having an opening; the receiving tank serving for receiving coffee powders or tea powders therein; and wherein the liquid of the liquid storage tank is filled into the filtering tank; and then high pressure air from the air tank is transferred into the filtering tank so that the liquid within the filtering tank suffers from a uniform air pressure and then flows to the receiving tank; as a result, the liquid is uniform mixed with the coffee or tea powders within the receiving tank.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 7, the air pressured coffee or tea filtering machine according to the present invention is illustrated. The present invention includes the following elements.

Figure 1:
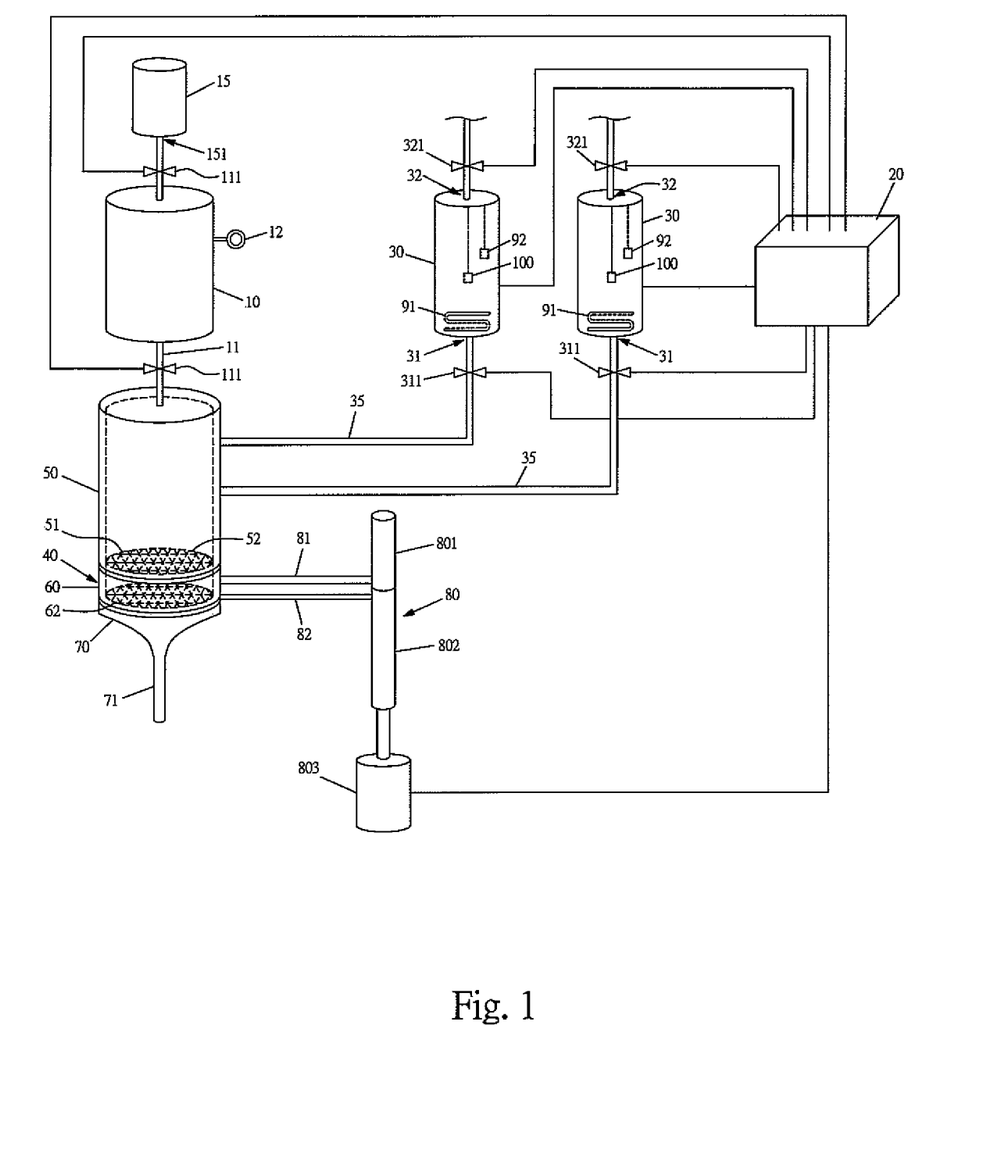
FIG. 1 is a schematic view about the combination of the elements according to the present invention.
Figure 2:
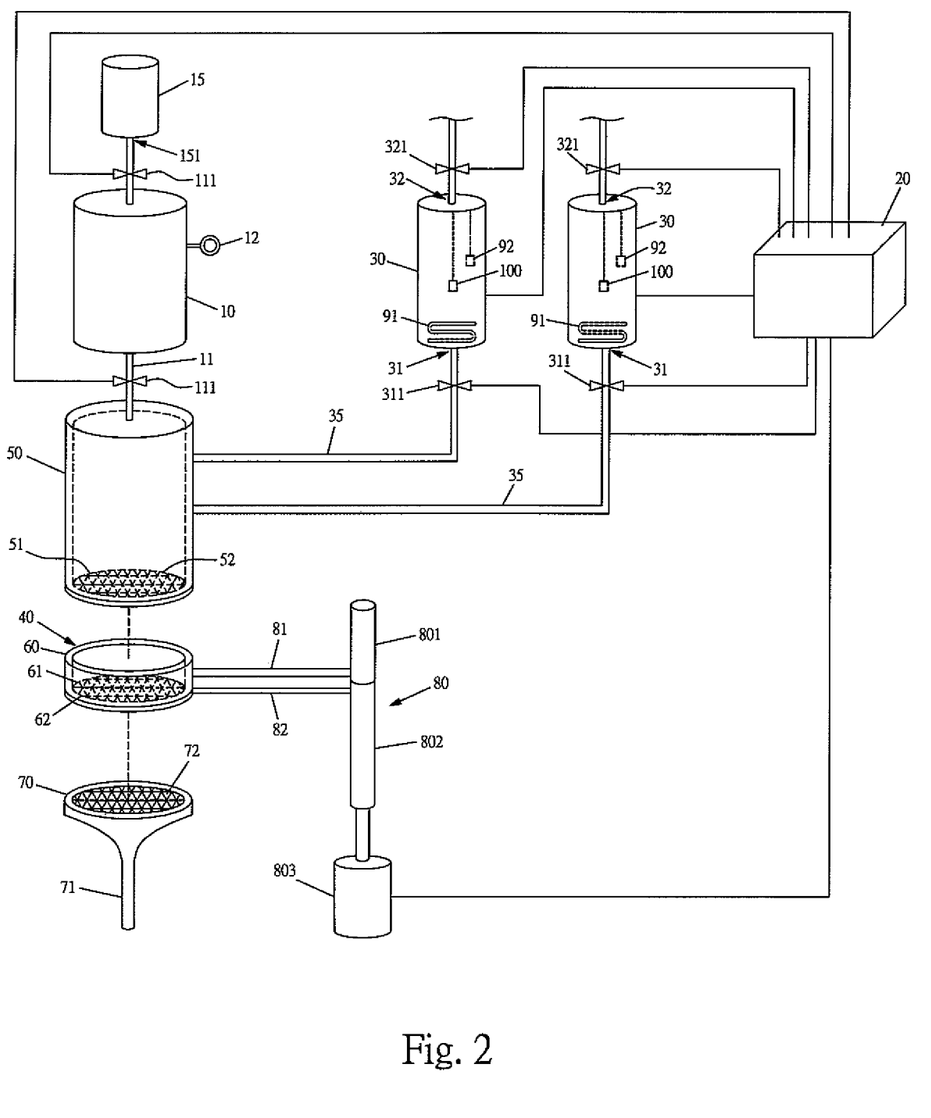
FIG. 2 is another assembled schematic view, where the filtering tank, receiving tank and the tray are separated.

An air tank 10 stores high pressure air therein. A top of the air tank 10 is connected to an output end 151 of an air compressor 15. A bottom of the air tank 10 is connected with a gas tube 11. The air compressor 15 serves to compress external air and then transfers the compressed air into the air tank 10 for driving the high pressure air within the air tank 10 and then the air is transferred out through the gas tube 11. With reference to FIG. 1, the output end 151 of the air tank 10 and the gas tube 11 are installed with respective pressure reduction valves 111 for controlling air pressure flowing therethrough. The air pressure within the air tank 10 is controllable. The air tank 10 has a pressure display 12 for displaying pressure.

At least one liquid storage tank 30 serves to store liquid therein. The liquid storage tank 30 has an output end 31 which is installed with a liquid output valve 311 for controlling flow rate of the liquid storage tank 30. In this example, there are two liquid storage tanks 30 are shown. However, this is not used to confine the scope of the present invention.

A control unit 20 is connected to the liquid storage tank 30 for controlling liquid flowing from the at least one liquid storage tank 30.

A filtering tank 50 is installed below the air tank 10 and is connected the output end 31 of the at least one liquid storage tank 30. A bottom of the filtering tank 50 has an opening 51. A first filtering net 52 is detachably installed in the opening 51. Preferably, the volume of the filtering tank 50 is smaller than 150 cc.

A liquid transfer tube 35 is connected between the filtering tank 50 and the output end 31 of at least one liquid storage tank 30. The liquid (preferably water) of the liquid storage tank 30 is transferred to the filtering tank 50 through the liquid transfer tube 35 and flows out of the filtering tank 50 through the first filtering net 52.

An upper end of the filtering tank 50 is connected to the gas tube 11. In operation, liquid (water) within the liquid storage tank 30 is filled into the filtering tank 50. Then the high pressure air within the air tank 10 is inputted to the filtering tank 50 by driving of the air compressor 15 so as to push liquid within the filtering tank 50 to be out of the filtering tank 50. Because the air flowing into the filtering tank 50 will spread and diffuse rapidly so as to form a uniform pressure at the upper side of the liquid within the filtering tank 50.

A receiving tank 40 is installed below the opening 51 of the filtering tank 50. A bottom of the receiving tank 40 has an opening 61. The receiving tank 40 serves to receive coffee or tea powders;

The liquid of the liquid storage tank is filled into the filtering tank; and then high pressure air from the air tank is injected into the filtering tank so that the liquid within the filtering tank suffers from a uniform air pressure and then flows to the receiving tank; as a result, the liquid is uniform mixed with the coffee or tea powders within the receiving tank.

The receiving tank 40 includes the following elements.

A disk 60 is installed below the opening 51 of the filtering tank 50. The disk 60 has an opening 61 which is also the opening of the receiving tank 40.

A second filtering net 62 is detachably installed at the opening 61 of the disk 60 for filtering dregs. The receiving tank 40 serves to receive coffee powders or tea powers and liquid (water) from the filtering tank 50. The liquid from the filtering tank 50 will apply an approximate uniform pressure on the liquid within the receiving tank 40 so that coffee powder or tea powder can be uniformly mixed with the liquid as coffee liquid or tea liquid, and then they flow out from the lower side of the second filtering net 62.

A tray 70 is positioned below the receiving tank 40. The tray 70 has a tray filter net 72 (referring to FIG. 2) for filtering the coffee or tea liquid from the receiving tank 40. The control unit 20 is electrically connected to the tray 70. In operation, the control unit 20 drives the tray 70 to resist against a lower side of the second filtering net 62 so that the receiving tank 40 is tightly sealed with the tray 70. Therefore no liquid flows out from the gap between the receiving tank 40 and the tray 70. A bottom of the tray 70 has an output tube 71 for output the coffee or tea liquid. Preferably, the connection area between the receiving tank 40 and the output tube 71 has a gradually reduced form.

In the present invention, the first filtering net 52 and the second filtering net 62 are high density nets for reducing the permeation speed so that liquid has more time to remain in the filtering tank 50 and the coffee powders and tea powders have more time to remain in the receiving tank 40 so as to achieve the object of pouring and filtering.

In the present invention, the control unit 20 is electrically connected to and control the disk 60 and the second filtering net 62 so that the disk 60 and the second filtering net 62 may move to different locations.

Operation of the disk and second filtering net 62 will be described herein.

Figure 3:
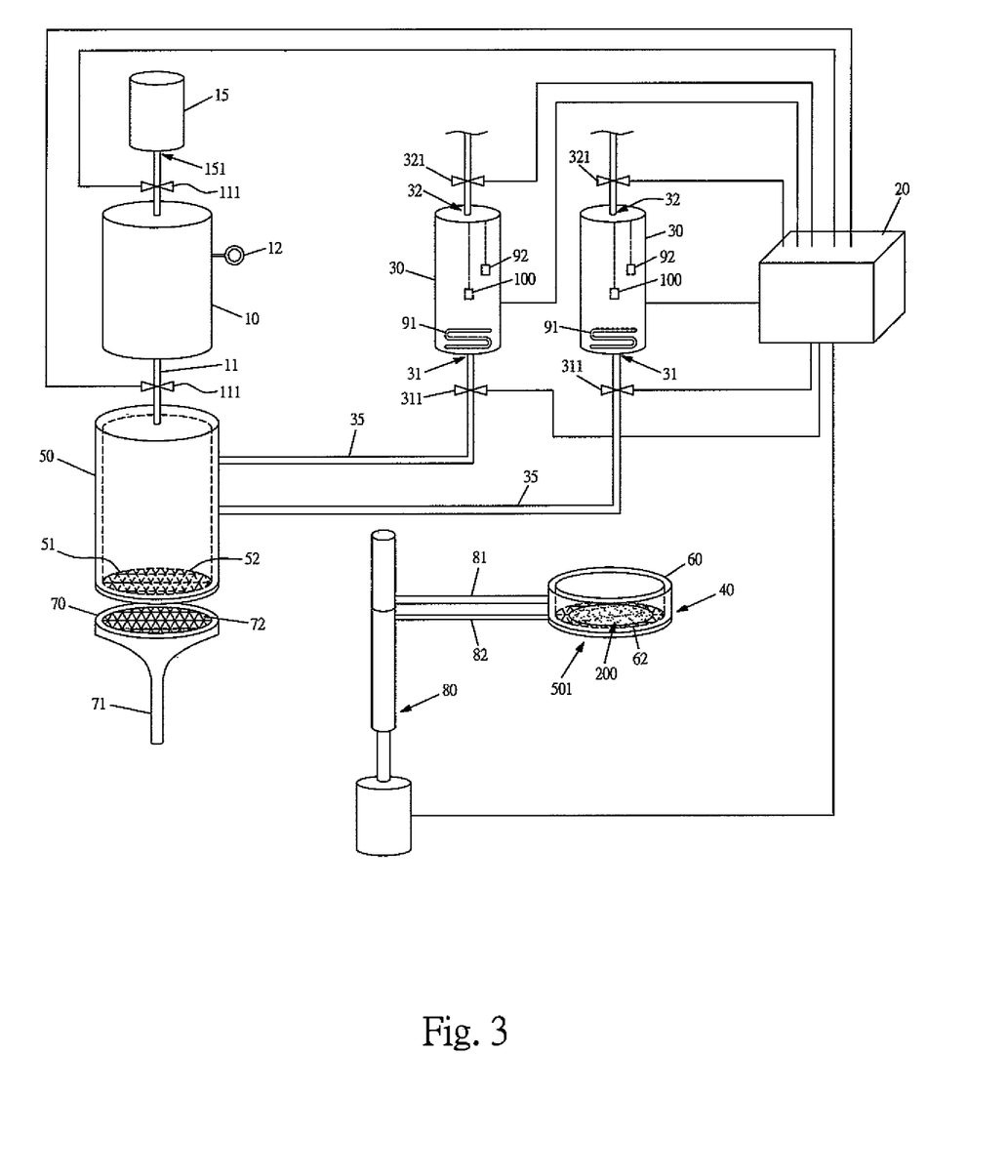
FIG. 3 is a schematic view showing the operation of filling powders.

In filling powders, as illustrated in FIG. 3, the control unit 20 controls the disk 60 and the second filtering net 62 to move to a first position 501. At this time, the disk 60 and the second filtering net 62 are overlapped for adding powders thereto.

Figure 4:
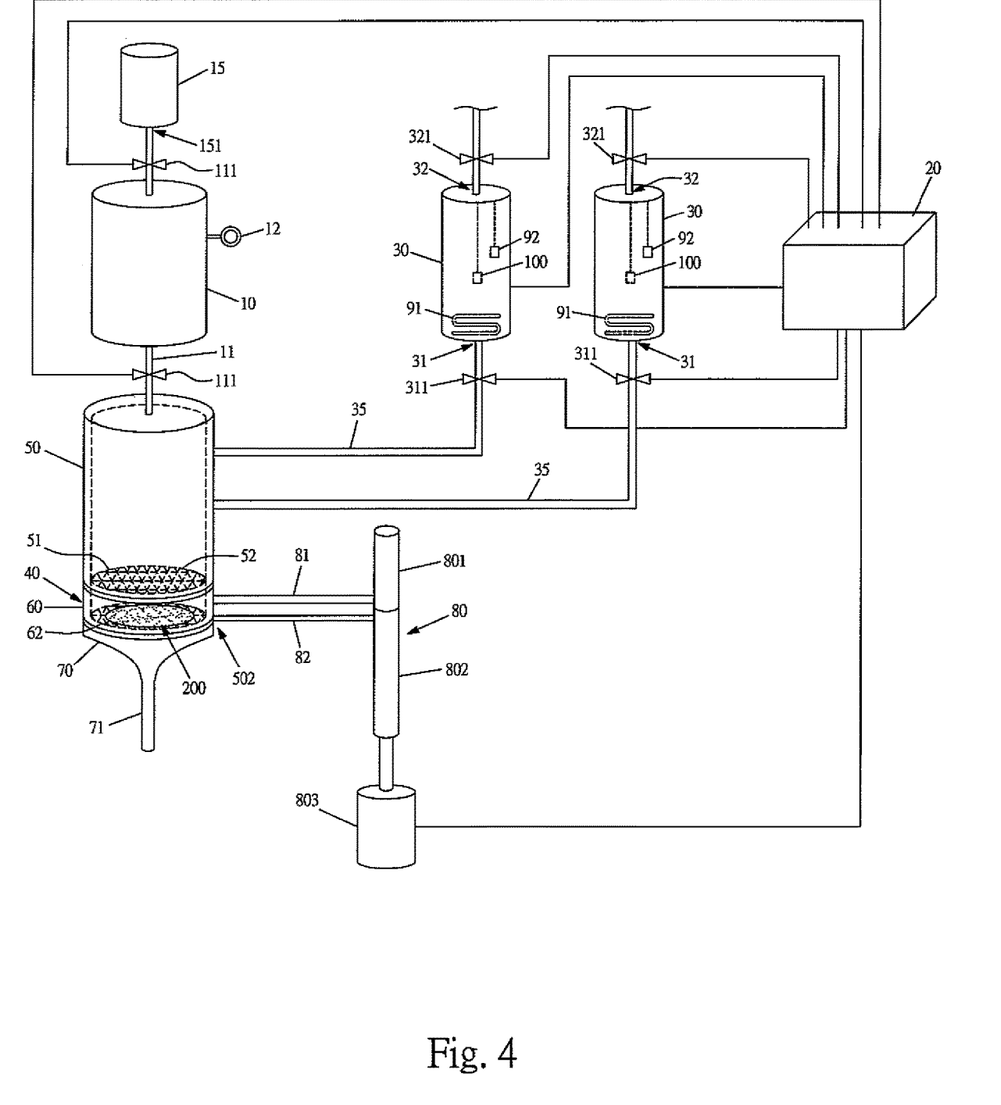
FIG. 4 is a schematic view showing the pouring operation of the present invention.

In pouring operation, as illustrated in FIG. 4, the control unit 20 controls the disk 60 and the second filtering net 62 to a second position 502 which is below the filtering tank 50. At this moment, the filtering tank 50, disk 60, second filtering net 62 and the tray 70 are overlapped for making coffee or tea.

Figure 5:
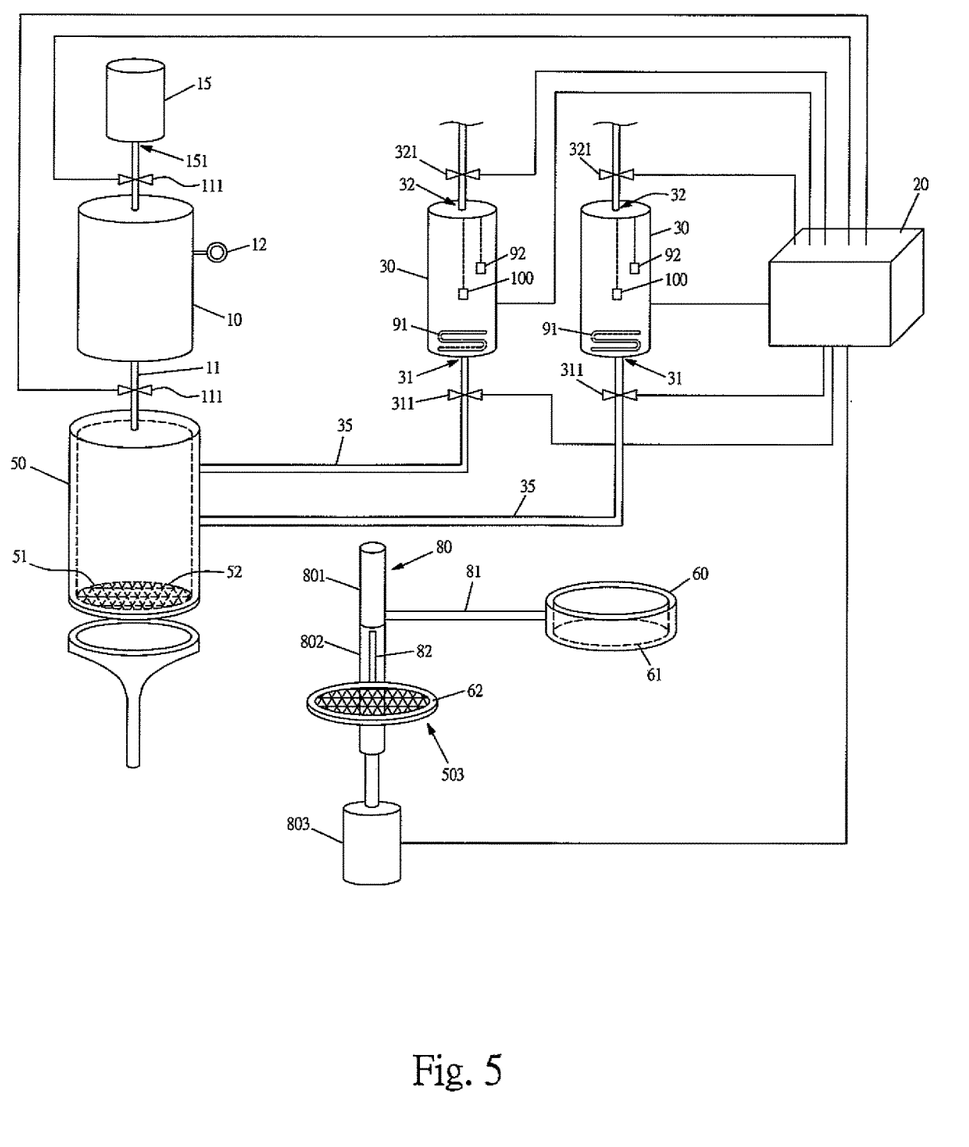
FIG. 5 is a schematic view showing the cleaning operation of the present invention.

In cleaning operation, as illustrated in FIG. 5, the control unit 20 controls the disk 60 and the second filtering net 62 to a third position 503, at this moment, the disk 60 and the second filtering net 62 are separated. The control unit 20 control the disk 60 and the second filtering net 62 to move upwards and downwards for removing the drags on the disk 60 and the second filtering net 62 out.

There are many ways for arrangement of the disk 60 and the second filtering net 62 and these ways are well known in the prior art. The following only describes an example, see FIGS. 1 and 7, for realizing the functions above mentioned, however this arrangement is not used to confine the scope of the present invention.

Figure 7:
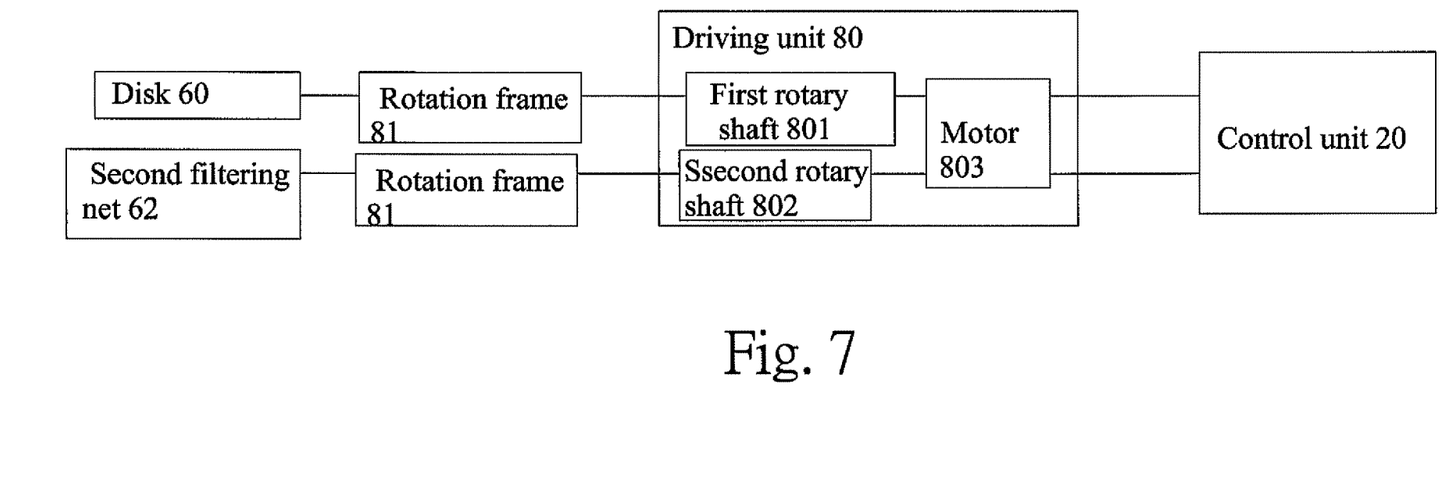
FIG. 7 is schematic view showing the upper rotation frame, lower rotation frame and driving unit of the present invention.

An upper rotation frame 81 has one end connected to the disk 60 and another end thereof is connected to the driving unit 80.

A lower rotation frame 82 has one end connected to the second filtering net 62 and another end thereof is connected to the driving unit 80.

The driving unit 80 serves to drive the upper rotation frame 81 and lower rotation frame. 82 so that the disk 60 and the second filtering net 62 moves to the first, second and third positions.

The control unit 20 is electrically connected to the driving unit 80 for controlling the driving unit 80 to further control the movement of the upper rotation frame 81 and the lower rotation frame 82.

The driving unit 80 includes a first rotary shaft 801, a second rotary shaft 802 and a motor 803. The first rotary shaft 801 and second rotary shaft 802 are connected to and driven by the motor 803. The first rotary shaft 801 is connected to the upper rotation frame 81 and the second rotary shaft 802 is connected to the lower rotation frame 82. Rotation of the first rotary shaft 801 and the second rotary shaft 802 drives the upper rotation frame 81 and lower rotation frame 82 to rotation therewith. The drawing shows that the first rotary shaft 801 and second rotary shaft 802 are coaxial. The driving unit 80 may drive the upper rotation frame 81 and lower rotation frame 82 through gears (not shown) to move up and down. This is known in the prior art and thus the details will not be further described herein.

Figure 6:
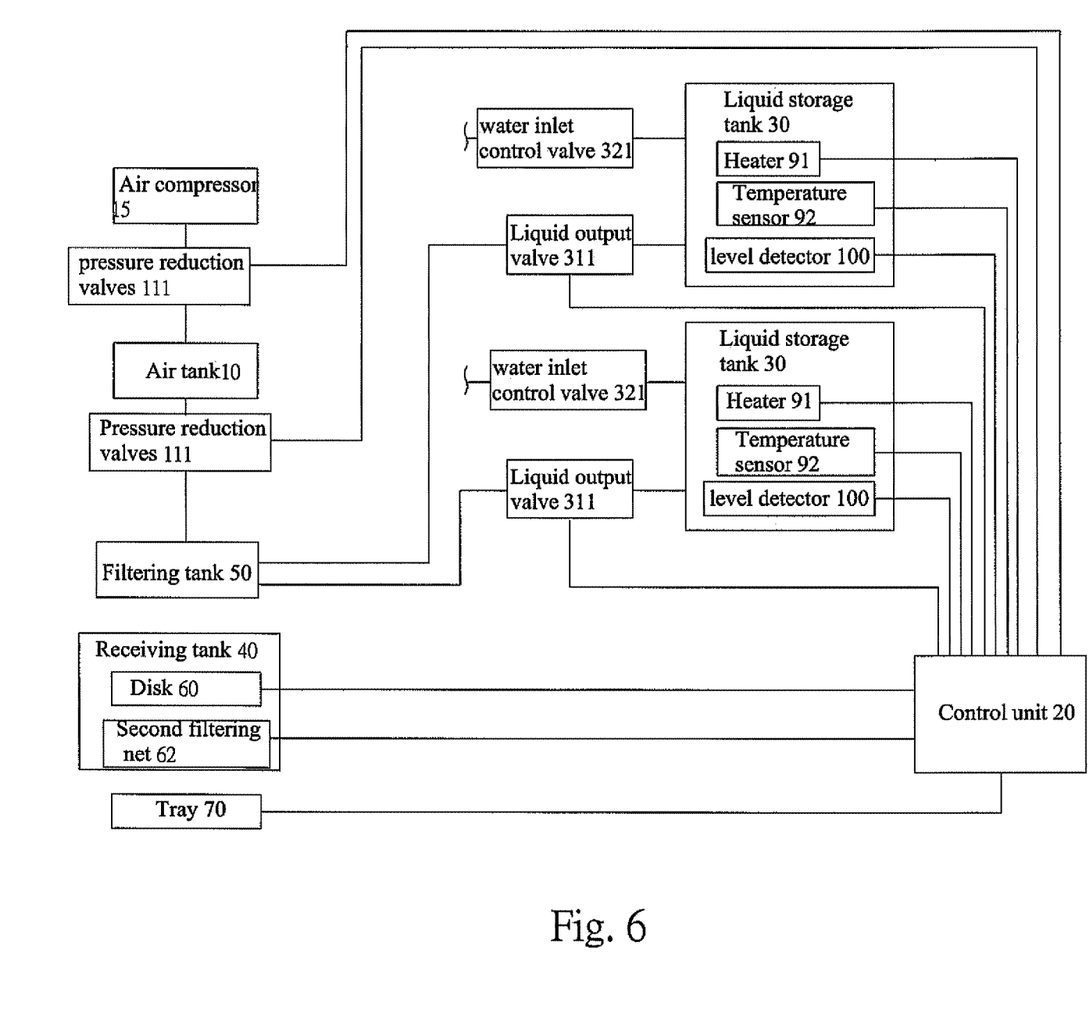
FIG. 6 is a schematic view showing the control structure of the present invention.

FIG. 6 shows the control structure of the present invention, wherein the control unit 20 is connected to a water control valve 311 for adjusting liquid flow of the liquid storage tank 30. Furthermore, the control unit 20 may control the opening and closing of the water control valve 311 for controlling the liquid outlet of each liquid storage tank 30.

The control unit 20 is further connected to a pressure reduction valve 111 for adjusting the air output volume of the air tank 10.

Each liquid storage tank 30 may be further installed with a heater 91 for heating liquid within the liquid storage tank 30.

Each liquid storage tank 30 is further installed with a temperature sensor 92 for detecting liquid temperature and then controlling the heating of the heater 91 so as to adjust the temperature of liquid within the liquid storage tank 30.

The control unit 20 is electrically connected to the temperature sensor 92 and the heater 91 for adjusting the liquid temperature within the liquid storage tank 30 based on the detection results from the temperature sensor 92.

Based on above mentioned structure, the control unit 20 could control the air pressure of the air tank 10, the liquid temperature of the liquid storage tank 30 and the liquid output volume of the liquid storage tank 30.

Each liquid storage tank 30 further includes an input end 32 which is connected to an external liquid source for supplying water to the liquid storage tank 30. Each input end of the liquid storage tank 30 is installed with a water inlet control valve 321.

Each liquid storage tank 30 is further installed with a level detector 100 which is connected to the control unit 20. The level detection 100 serves to detect the level of the liquid storage tank 30 and then transfers the detection result to the control unit 20. When the level of the liquid storage tank 30 is lower than a predetermined value, the control unit 20 opens the water inlet valve 321 of the liquid storage tank 30 for inputting liquid into the liquid storage tank 30.

Advantages of the present invention are that: high pressure air is inputted into the filtering tank by using the air tank so that the surface of the filtering tank is suffered from a uniform pressure. When the liquid inputted to the disk, the coffee powders or tea powders on the disk are uniformly mixed with the liquid (water). By the way of the present invention, the coffee or tea liquid has uniform quality and thus the coffees or teas of different cups have the same odors. The control unit serves to control the liquid amount and temperature from the liquid storage tank to the filtering tank. The control unit could control the movement of the receiving tank to different positions for pouring, cleaning and filling.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An air compressed coffee or tea making machine, comprising:
    an air tank storing high pressure air therein; a top of the air tank being connected to an output end of an air compressor; a bottom of the air tank being connected with a gas tube; the air compressor serving to compress external air and then transfers the compressed air into the air tank for driving the high pressure air within the air tank and then the air being transferred out through the gas tube, air pressure within the air tank being controllable;
    at least one liquid storage tank for storing liquid therein; the liquid storage tank having an output end; and flow rate at the output end of the liquid storage tank being controllable;
    a control unit connected to the liquid storage tank for controlling liquid flowing from the at least one liquid storage tank;
    a filtering tank installed below the air tank and connected the output end of the at least one liquid storage tank; a bottom of the filtering tank having an opening; a first filtering net being detachably installed in the opening of the filtering tank;
    a receiving tank installed below the opening of the filtering tank; a bottom of the receiving tank having an opening; the receiving tank serving for receiving coffee powders or tea powders therein; and
    wherein the liquid of the liquid storage tank is filled into the filtering tank; and then high pressure air from the air tank is transferred into the filtering tank so that the liquid within the filtering tank suffers from a uniform air pressure and then flows to the receiving tank; as a result, the liquid is uniformly mixed with the coffee or tea powders within the receiving tank.

2. The air compressed coffee or tea making machine as claimed in claim 1, wherein a liquid transfer tube is connected between the filtering tank and the output end at least one liquid storage tank; the liquid of the liquid storage tank is transferred to the filtering tank through the liquid transfer tube and flows out of the filtering tank through the first filtering net; and
    wherein an upper end of the filtering tank is connected to the gas tube; in operation, liquid within the liquid storage tank is filled into the filtering tank; then the high pressure air within the air tank is inputted to the filtering tank by driving of the air compressor so as to push liquid within the filtering tank to be out of the filtering tank; because the air flowing into the filtering tank will spread and diffuse rapidly so as to form a uniform pressure at an upper side of the liquid within the filtering tank.

3. The air compressed coffee or tea making machine as claimed in claim 2, wherein the receiving tank includes:
    a disk installed below the opening of the filtering tank; the disk having an opening which is also the opening of the receiving tank;
    a second filtering net detachably installed at the opening of the disk for filtering dregs; the receiving tank serving to receive coffee powders or tea powers and liquid from the filtering tank; the liquid from the filtering tank will apply an approximate uniform pressure on the liquid within the receiving tank so that coffee powders or tea powders can be uniformly mixed with the liquid as coffee liquid or tea liquid, and then they flow out from a lower side of the second filtering net.

4. The air compressed coffee or tea making machine as claimed in claim 3, wherein a tray is positioned below the receiving tank; the tray has a tray filter net for filtering the coffee or tea liquid from the receiving tank the control unit is electrically connected to the tray; in operation, the control unit drives the tray to resist against a lower side of the second filtering net so that the receiving tank is tightly sealed with the tray; a bottom of the tray has an output tube for outputting the coffee or tea liquid.

5. The air compressed coffee or tea making machine as claimed in claim 3, wherein the control unit is electrically connected to and control the disk and the second filtering net so that the disk and the second filtering net moves to different locations.

6. The air compressed coffee or tea making machine as claimed in claim 1, wherein in filling powders, the control unit controls the disk and the second filtering net to move to a first position; at this time, the disk and the second filtering net are overlapped for adding powders thereto.

7. The air compressed coffee or tea making machine as claimed in claim 4, wherein in pouring operation, the control unit controls the disk and the second filtering net to a second position which is below the filtering tank; at this moment, the filtering tank, the disk, the second filtering net and the tray are overlapped for making coffee or tea.

8. The air compressed coffee or tea making machine as claimed in claim 3, wherein in cleaning operation, the control unit controls the disk and the second filtering net to a third position, at this moment, the disk and the second filtering net are separated; the control unit control the disk and the second filtering net to move upwards and downwards for removing the drags on the disk and the second filtering net.

9. The air compressed coffee or tea making machine as claimed in claim 3, further comprising:
- an upper rotation frame having one end connected to the disk and another end thereof connected to the driving unit;
- a lower rotation frame having one end connected to the second filtering net and another end thereof connected to the driving unit;
- the driving unit serving to drive the upper rotation frame and lower rotation frame so that the disk and the second filtering net moves to different positions;
- the control unit being electrically connected to the driving unit for controlling the driving unit to further control the movement of the upper rotation frame and the lower rotation frame; and
- wherein the driving unit including a first rotary shaft, a second rotary shaft and a motor; the first rotary shaft and second rotary shaft are connected to and driven by the motor; the first rotary shaft is connected to the upper rotation frame and the second rotary shaft is connected to the lower rotation frame; rotation of the first rotary shaft and the second rotary shaft drives the upper rotation frame and lower rotation frame to rotation therewith.

10. The air compressed coffee or tea making machine as claimed in claim 4, wherein the connection area between the receiving tank and the output tube has a gradually reduced form.

11. The air compressed coffee or tea making machine as claimed in claim 1, wherein each liquid storage tank further includes an input end which is connected to an external liquid source for supplying water to the liquid storage tank; each input end of the liquid storage tank is installed with a water inlet control valve; and
- each liquid storage tank is further installed with a level detector which is connected to the control unit; the level detection serves to detect the level of the liquid storage tank and then transfers the detection result to the control unit; wherein when the level of the liquid storage tank is lower than a predetermined value, the control unit opens the water inlet valve of the liquid storage tank for inputting liquid into the liquid storage tank.

12. The air compressed coffee or tea making machine as claimed in claim 1, wherein the control unit is connected to a water control valve for adjusting liquid flow of the liquid storage tank; and the control unit controls the opening and closing of the water control valve for controlling the liquid outlet of each liquid storage tank; and
- wherein the control unit is connected to a water control valve for adjusting liquid flow of the liquid storage tank, the control unit controls the opening and closing of the water control valve for controlling the liquid out of each liquid storage tank.

13. The air compressed coffee or tea making machine as claimed in claim 1, wherein the output end of the air tank and the gas tube are installed with respective pressure reduction valves for controlling air pressure flowing therethrough; and
- the control unit is further connected to a pressure reduction valve for adjusting the air output volume of the air tank.

14. The air compressed coffee or tea making machine as claimed in claim 1, wherein each liquid storage tank is installed with a heater for heating liquid within the liquid storage tank;
- each liquid storage tank is installed with a temperature sensor for detecting liquid temperature and then controlling the heating of the heater so as to adjust the temperature of liquid within the liquid storage tank; and
- the control unit is electrically connected to the temperature sensor and the heater for adjusting the liquid temperature within the liquid storage tank based on the detection results from the temperature sensor.

15. The air compressed coffee or tea making machine as claimed in claim 1, wherein the air tank has a pressure display for displaying pressure.

* * * * *